(12) United States Patent
Mailhot et al.

(10) Patent No.: US 7,286,571 B2
(45) Date of Patent: Oct. 23, 2007

(54) SYSTEMS AND METHODS FOR PROVIDING ON-DEMAND DATACASTING

(75) Inventors: John Norman Mailhot, Bridgewater, NJ (US); R. Scott McCaskill, Newton, NJ (US); Rajesh Rajagopalan, Fremont, CA (US); Robert A. Resuta, Bridgewater, NJ (US); Michael J. Scheutzow, Parsippany, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 958 days.

(21) Appl. No.: 10/199,236

(22) Filed: Jul. 19, 2002

(65) Prior Publication Data

US 2004/0013136 A1 Jan. 22, 2004

(51) Int. Cl.
*H04J 3/02* (2006.01)

(52) U.S. Cl. ...................... 370/537; 370/487

(58) Field of Classification Search ............... 370/537, 370/412, 468, 486, 487, 395.4, 395.41
See application file for complete search history.

(56) References Cited

U.S. PATENT DOCUMENTS 6,246,701 B1 * 6/2001 Slattery ................... 370/503
2002/0064177 A1 * 5/2002 Bertram et al. ............ 370/458
2002/0106987 A1 * 8/2002 Linden ..................... 455/12.1
2002/0146023 A1 * 10/2002 Myers ....................... 370/412
2002/0154887 A1 * 10/2002 Lu ............................ 386/35

* cited by examiner

*Primary Examiner*—Brian Nguyen

(57) ABSTRACT

The present invention provides systems and methods for providing on-demand datacasting. A system according to an exemplary embodiment of the present invention comprises a rate generator for controlling the rate at which data signals are combined with audio/video signals. The system may also include a system controller for controlling the rate of the rate generator. The system controller may also monitor the complexity of the audio/video signals, calculate an average complexity of the audio/video signals, calculate an average complexity of the audio/video signals and determine whether the average complexity is greater than the typical complexity of audio/video signals. The system controller may adjust the rate of the rate generator based on the determination of whether the average complexity of the audio/video signals is greater than the typical complexity of audio/video signals.

20 Claims, 2 Drawing Sheets

SYSTEMS AND METHODS FOR PROVIDING
ON-DEMAND DATACASTING

BACKGROUND OF THE INVENTION

In the field of data transmission, it is often desirable to use existing communication transmission infrastructure to transmit data to a desired destination. One area in which this is becoming increasingly desirable is the broadcast communication industry. Accordingly, datacasting, the point to multipoint delivery of data using the broadcast spectrum, is an increasingly important area in the field of data transmission. Technologies such as MPEG-2 have made possible the transmission of coded digital video and audio over the broadcast spectrum. In datacasting, data is multiplexed along with coded video and audio data.

Two modes of datacasting are commonly used: constant bit rate datacasting and opportunistic datacasting. Constant bit rate datacasting operates by taking away some bandwidth from traditional programming to deliver data at a constant rate. Opportunistic datacasting takes advantage of inherent inefficiencies of spectrum usage by replacing null packets with data. To see why inefficiencies may arise, consider an example where a 19.39 Mbits/second channel is used to deliver high definition programming. When encoding a football game using MPEG-2, the encoded video and audio data may use up the entire channel. On the other hand, a less active program may use between 17 and 19.39 Mbits/second depending on instantaneous scene activity. Typically, the remaining bandwidth is filled with null packets. Using opportunistic datacasting, this may be replaced with data packets.

Datacasting enables broadcasters to realize new revenues with existing spectrum. As an example, a broadcaster can transmit a newspaper to subscribers during off peak hours when the entire channel is not being used for traditional video services. Other potential applications include play along games, sports statistics, enhanced advertising, corporate communications, local weather and emergency information, coupons, ebooks, mp3 audio, low bit rate mpeg-4 video, software, newsgroups, magazines and news downloads.

While opportunistic datacasting improves the efficiency of a broadcast channel by reclaiming lost bandwidth, a major problem with it is the lack of quality of service (QOS) guarantees. Since opportunistic datacasting only replaces existing null packets (which occur at random), no guarantees on throughputs can be made. Using constant bit rate datacasts on the other hand, lowers the quality of traditional video services since it takes bandwidth away.

Therefore, it is evident that there is a need in the art for systems and methods for providing on-demand datacasting with a QOS guarantee.

SUMMARY OF THE INVENTION

The present invention overcomes the limitations of the existing technology by providing systems and methods for providing on-demand datacasting. A system according to an exemplary embodiment of the present invention comprises: a rate generator adapted to control the rate at which one or more first input signals are combined with one or more second input signals and to output combined signals comprising first and second input signals. Additionally, the system may also comprise a system controller adapted to adjust the rate at which the rate generator combines first input signals with second input signals.

The system of the present invention may also be adapted to monitor second input signals on one or more second input signal channels; determine the complexity of each of said one or more second input signal channels; calculate the average complexity of the one or more second signal channels; and determine whether the average complexity of the one or more second input signal channels is greater than or equal to a typical second input signal channel complexity. Additionally, the system of the present invention may be further adapted to apply opportunistic datacasting if the second input signal complexity is greater than or equal to the typical second input signal complexity. Additionally, the system of the present invention may be further adapted to assign extra bandwidth for first input signals if the second input signal complexity is less than the typical second input signal complexity; and apply statistical multiplexing to output second signals using reduced bandwidth. Additionally, the system may be further adapted to determine whether first input signals are on track for completion; assign extra bandwidth for first input signals if first input signal transmission is not on track for completion; and reduce the bandwidth allocated to each second input signal transmission channel using statistical multiplexing.

The system may also comprise one or more data servers for providing first data signals; and a datacasting multiplexer coupled to the one or more data servers and to the rate generator for providing first data signals from the one or more data servers to the rate generator.

Other objects, features, and advantages of the present invention will become apparent upon reading the following detailed description of the embodiments of the invention, when taken in conjunction with the accompanying drawings and appended claims.

DETAILED DESCRIPTION

Figure 1:
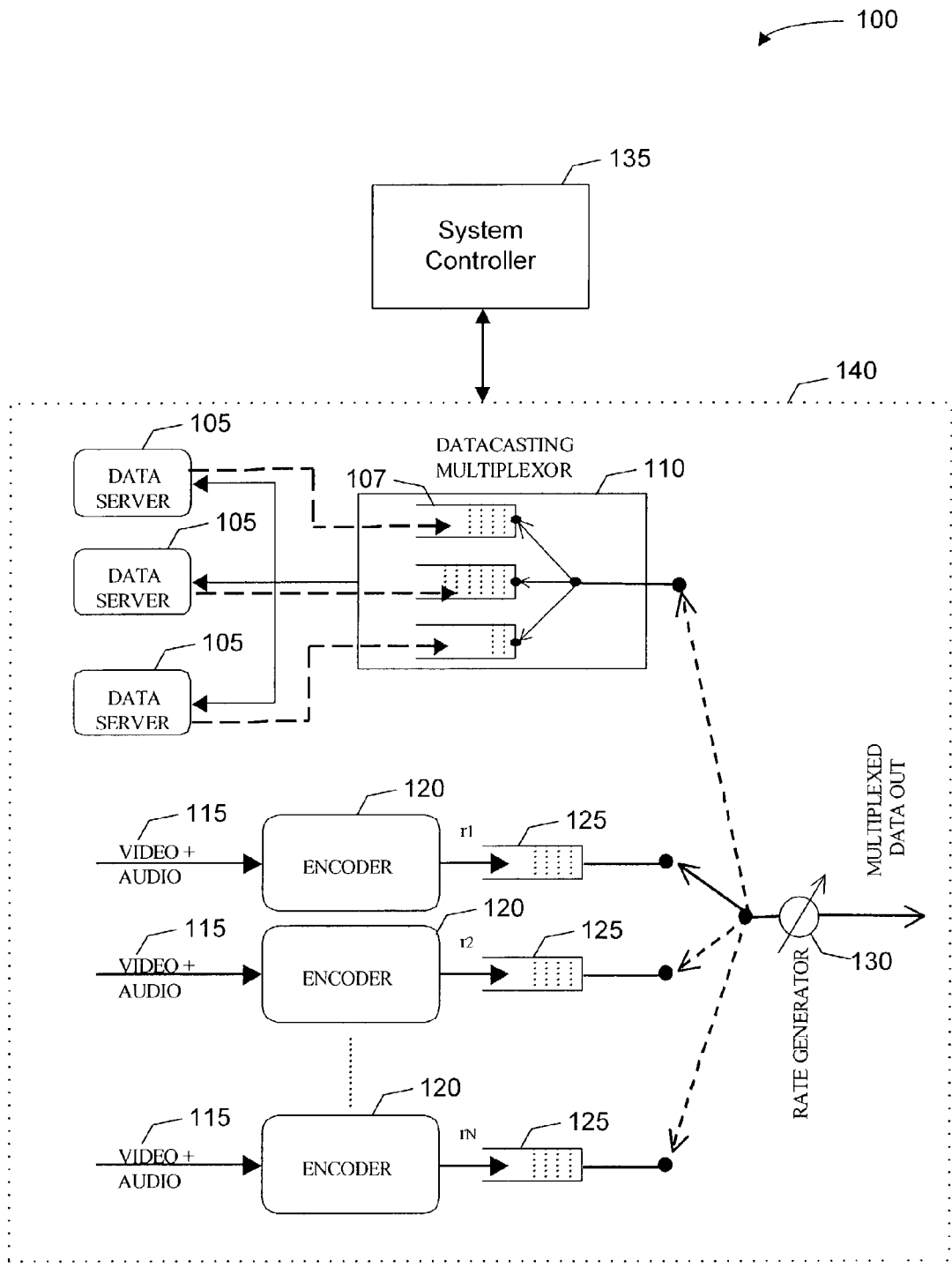
FIG. 1 is a block diagram of a system for providing on-demand datacasting according to an exemplary embodiment of the present invention.

Referring now to the drawings, in which like numerals refer to like techniques throughout the several views, exemplary embodiments of the present invention are described.

FIG. 1 is a block diagram of a system for providing on-demand datacasting according to an exemplary embodiment of the present invention. In this embodiment, a plurality of data servers 105 provides data through a datacasting multiplexer 110 to a rate generator 130. The rate generator 130 also receives encoded video and audio signals. Video/Audio signals 115 are provided to encoders 120 for encoding prior to being transmitted. The encoders 120 provide the encoded video/audio signals to buffers 125. The video/audio signals pass through the buffers 125 and are provided to the rate generator 130. The rate generator 130 combines the data signals with the video/audio signals and provides a combined signal, carrying video/audio signals and data signals, for transmission.

On-demand datacasting is a variable rate datacast that, in addition to reclaiming lost bandwidth, creates space in the encoded stream by influencing the encoding rates of video services. It does this by integrating with statistical multiplexing. On-demand datacasting is a powerful new paradigm that incorporates the best of both constant bit rate and opportunistic datacasting while preserving the quality of traditional programming. By incorporating quality of service, on-demand datacasting provides a framework for broadcasters to offer service level agreements to service providers leasing bandwidth.

Most transmission channels used for the delivery of compressed video and audio programming are constant bit rate with a bandwidth high enough to accommodate several compressed programs. As an example, between five and eight MPEG-2 programs can be fit into a 27 Mbits/second MMDS (multichannel multipoint distribution system) spectrum depending on the quality desired and the type of encoding chosen. For instance, if the encoding mode is constant bit rate, since scene content varies with time, maintaining a minimum quality level requires the rate to be matched to the most complex scene within a video source. Therefore, the system could perhaps accommodate five channels. This leads to inefficiencies in bandwidth usage.

One way to avoid this problem is to vary the average encoding rate for each program based on scene content (as opposed to keeping it fixed as in constant CBR). Channel bandwidth may be distributed dynamically by allocating more bits for complex sources and less for the simpler ones. This strategy, termed statistical multiplexing, leads to efficient use of bandwidth and results in good quality encoding at all times.

To perform this dynamic distribution of bandwidth, a system controller monitors the coding complexity of each program. One complexity estimation method is $$C_i[n] = \frac{1}{M} \sum_{j=n-M-1}^{n-1} b_j \times Q_j$$

where $b_j, Q_j$ are the number of bits and average quantization value associated with the coding of picture j and M is some integer. $C_i[k]$ represents the complexity of signal channel "i" at discrete time instant or iteration "k". The higher the complexity, the more complex the picture is to encode. The total bandwidth BW is parceled among the programs as $$R_i[k] = \left\lceil \frac{C_i[k]}{\sum_{j=1}^{N} C_j[k]} \right\rceil \times BW$$

where $R_i[k]$ is the rate allocated to signal channel "i" at discrete time instant or iteration "k". Quality of service for a datacast may be characterized by a 5-tuple $\{R, R_{min}, R_{max}, t_0, T\}$ schedule. This implies that an average rate of Rbits/second are provided to the datacast such that the minimum instantaneous rate is greater than or equal to $R_{min}$ bits/second and the maximum instantaneous rate is less than or equal to $R_{max}$ bits/second. The average rate is computed as the sum of bits over the interval $(t_0, t_0+T)$ divided by T. In addition, support may be provided for the 5-tuple to be changed at time $(t_0+T)$.

The 5-tuple schedule is demonstrated through the following example: a broadcaster sets the QOS parameters as {500,000; 100,000; 2,000,000; 6:00 a.m.; 300 seconds}. This implies that the datacast rate desired is 0.5 Mbits/second averaged over a five minute period form 6:00 a.m. to 6:05 a.m. The instantaneous (computed as the rate over some small time window, typically 100 milliseconds) minimum and maximum rates are desired to be 100 Kbits/second and 2 Mbits/second respectively. The broadcaster sets similar parameters until 5:50 p.m. At 6:00 p.m. an advertisement is to be shown and an application of size 7 Mbits related to the advertisement launched in the user set top box. The broadcaster can burst it across by changing the QOS schedule to {3,500,000; 1,000,000; 6,000,000; 5:50 p.m.; 120 seconds} allowing the higher rate application to be sent to the set top by 5:52 p.m.

The present invention may be used to enforce the requested QOS. Assume that there are N channels of active video programming and M channels of on-demand datacasts to be broadcast over a channel of bandwidth R. Assume that the video and datacast rates are updated at time instants $t_n$ corresponding to discrete iteration k. Associated with each video channel j is a complexity parameter $C_j[k]$ which indicates how difficult the video is to encode at iteration k. Define the instantaneous and long term average video complexities respectively as $$\overline{C}_V[n] = \frac{1}{N} \sum_{j=1}^{N} C_j[n] \qquad \text{Equation 1}$$

$$\overline{C}_{LT}[n] = \frac{\rho \overline{C}_{LT}[n-1] + \overline{C}_V[n]}{\rho + 1}$$

where ρ is a parameter used to tradeoff the contribution of the past and current complexities. The larger the parameter, ρ, the slower the rate of change of the long term average. Assume that the current time window for datacast i is $\{t_{i,0}, t_{i,0}+T_i\}$. If the iteration intervals are much smaller than the time window, there exist two iterations such that $\{t_{i,m} \approx t_{i,0}, t_{i,1} \approx t_{i,0}+T_i\}$. For the remainder of this subsection, subscript i is dropped for ease of exposition.

Lemma: If the ratesfor each iteration R[k], $t_k \leq t < t_k+1$ are set as $$\delta[k] = \delta[k-1] + (R - R_{act}[k-1]) \times (t_k - t_{k-1}) \qquad \text{Equation 2}$$

with $\delta[m] = 0$ $$\Phi = \left[R + \frac{\delta[k]}{t_l - t_k}\right] \times f(k; \overline{C}_V[k-1]; \overline{C}_{LT}[k-1]);$$

$$\forall m \leq k \leq l-1$$

$$R[k] = \text{median}\{R_{min}, \Phi, R_{max}\}$$

where $R_{act}$ is the average actual rate for this interval computed as $$R_{act}[k] = \frac{b[k]}{(t_{k+1} - t_k)}$$

with b[k] the actual number of bits produced in this interval, then $$\sum_{k=m}^{l-1} R_{act}[k] \times (t_{k+1} - t_k) = R \times T - \Delta$$

$$\text{with } \Delta = \frac{(R[l-1] - (f_{l-1} \times R_{act}[l-1]))}{f_{l-1}} \times (t_l - t_{l-1})$$

i.e, the total bits produce will equal R×T within a bound.

Proof: The proof follows by substituting recursively the δ relationships in the equation in R[l-1]

Since $R[l-1] = \left(R + \frac{[[-1]]}{(t_l - t_{l-1})}\right) \times f_{l-1}$ and $\Delta = \frac{(R[l-1] - (f_{l-1} \times R_{act}[l-1]))}{f_{l-1}} \times (t_l - t_{l-1})$ $\Rightarrow R_{act}[l-1] \times (t_l - t_{l-1}) = R \times (t_l - t_{l-1}) + \delta[l-1] - \Delta$ $\Rightarrow R_{act}[l-1] \times (t_l - t_{l-1}) = R \times (t_l - t_{l-1}) + [l-2] + (R - R_{act}[l-2]) \times (t_{l-1} - t_{l-2}) - \Delta$ $\Rightarrow R_{act}[l-1] \times (t_l - t_{l-1}) + R_{act}[l-2]) \times (t_{l-1} - t_{l-2}) = R \times (t_l - t_{l-2}) + [[-2]] - \Delta$ i.e., $\sum_{k=l-2}^{l-1} R_{act}[k] \times (t_{k+1} - t_k) = R \times (t_l - t_{l-2}) + [[-2]] - \Delta$ $\Rightarrow \sum_{k=l-2}^{l-1} R_{act}[k] \times (t_{k+1} - t_k) = R \times (t_l - t_{l-2}) + [[-3]] + (R - R_{act}[l-3]) \times (t_{l-2} - t_{l-3}) - \Delta$ $\Rightarrow \sum_{k=l-3}^{l-1} R_{act}[k] \times (t_{k+1} - t_k) = R \times (t_l - t_{l-3}) + [[-3]] - \Delta$ Continuing this manner $$\sum_{k=m}^{l-1} R_{act}[k] \times (t_{k+1} - t_k) = R \times (t_l - t_m) + [[m - \Delta$$

$$\Rightarrow \sum_{k=m}^{l-1} R_{act}[k] \times (t_{k+1} - t_k) = R \times T - \Delta$$

The lemma states that the rate during each interval for a datacast be set as the modulated adjusted CBR rate of that datacast. Note that R is the rate at which the datacast would operate if it were constant bit rate. The adjustment factor is the deviation in bit production thus far from the bits that would have been produced if this datacast were CBR. The modulation factor is provided by the function f( ) (see Equation 2). The function serves the purpose of modulating the datacasting rates. As an example, if the function is unity (i.e.,f( )=1 always), then the solution is the trivial constant bit rate solution, i.e., R[k]=R for all iteration intervals. On the other hand, choosing it to be $$f(k; \overline{C}_V[k-1]; \overline{C}_{LT}[k-1]) = \frac{\overline{C}_{LT}[k-1]}{\overline{C}_V[k-1]} \quad \forall m \leq k < l \quad \text{Equation 3}$$

forces the datacasting rates to vary inversely proportional to the instantaneous complexity of the video programs in the StatMux as compared with their long term averages. This is indeed the desirable mode of operation since if the video programs are more complex than usual; we would like to give them a higher rate to maintain picture quality.

If the rates for each iteration are set as stated, then the average datacast bit production over the window will meet the requirements within a bound. The bound will be dependent on the modulation function. If the modulation function were unity for this iteration, then the bound is simply the difference in bit production from what was set to what was produced.

As described above, FIG. 1 is a block diagram of a system for providing on-demand data casting according to an exemplary embodiment of the present invention. FIG. 1 shows one implementation of a system that can multiplex datacast streams along with regular programming. Each of the various components of the system, according to an exemplary embodiment of the present invention, are described in greater detail as follows:

Datacasting Multiplexor (DCM) 110: The datacasting multiplexer 110 requests data from data servers 105 using a flow controlled protocol (such as SMPTE 325M) via Ethernet while each data server 105 returns data via a dedicated DVB-ASI interface. Data from each data server 105 is stored in a dedicated buffer 107. Output of data from each buffer is described below.

Encoder 120: Each encoder 120 has audio and video programs 115 input to it. An encoder 120 generates compressed data at a rate determined by the system controller 135 and stores them in dedicated buffers 125.

Rate generator 130: The rate generator 130 controls the rate at which data is generated from the system 100. When set with a particular rate r, it allows the system 100 to output a bit at every 1/r seconds.

System Controller 135: The system controller 135 is responsible for setting the rate of the rate generator 130, performing statistical multiplexing by allocating rates to each encoder 120 and controlling the operation of data output from the system 100.

The system controller 135 sets the rate of the rate generator 130 to the total bandwidth BW. At the beginning of each iteration k, the controller 135 assigns each encoder 120 a rate equal to $$R_i^v[k] = \left[\frac{C_i[k]}{\sum_{j=1}^{N} C_j[k]}\right] \times \left[BW - \left(\sum_{j=1}^{M} R_j^d[k] - \hat{R}_{null}[k]\right)\right] \quad \text{Equation 4}$$

$$\text{where } \hat{R}_{null}[k] = \sum_{i=1}^{L} \alpha_i \times \frac{b_{null}[k-i]}{t_{k-i} - t_{k-1-i}}$$

The first term corresponds to the ratio of the complexity of the program to the sum of complexities of all programs, and the second term is the available rate. The available rate is the difference between the total bandwidth and the total datacast rates corrected for the estimated null packet rate. The null packet rate is computed using an autoregressive (AR) model. Here, $b_{null}[k-i]$ is the number of null packets generated during iteration interval $\{t_{k-i}, t_{k-i+1}\}$ and $\alpha_i$ are the AR model parameters to be computed using a training set.

Each encoder 120 generates bits at a rate of $R_i^v[k]$ or less during the time interval $(t_k, t_{k+1})$. These bits are stored in dedicated buffers 125. When it is time for the system 100 to output data (as determined by the rate generator 130), data is removed from the encoder buffers 125 in a round robin fashion. If none of the encoder buffers 125 have any data present (which should happen at an average rate of $$R - \sum_{j=1}^{N} R_j^v + R_{null}),$$

data is obtained from one of the datacast buffers 107.

The datacast buffers 107 are also polled in a round robin fashion. For each datacast buffer 107 a threshold $th_i$ can be set which determines if data can be output from that buffer 107. That is, if any datacast buffer level is below its threshold, no data is taken from it and the next buffer is polled. There is one exception to this however: if all the datacast buffer levels are below their thresholds, data is taken from the buffers 107 in a round robin fashion till they run dry. The thresholds are set at the beginning of each iteration k as:

$$th_i[k] = \max\{0; B_i^d[k] - R_i^d[k] \times (t_{k+1} - t_k)\}$$

where $B_i^d[k]$ is the buffer level at the beginning of iteration k. To make sure that the buffer level is higher than the bits to be produced in the time interval, the datacast multiplexer 110 continuously monitors the level and requests data from the server if the level falls below 75%. While the latency for requesting and obtaining data is finite, it is typically smaller than an iteration interval (or can be made so by using a dedicated high speed link such as DVB-ASI for requesting and receiving data). Thus, it may be assured that the buffer 107 never runs dry.

Figure 2:
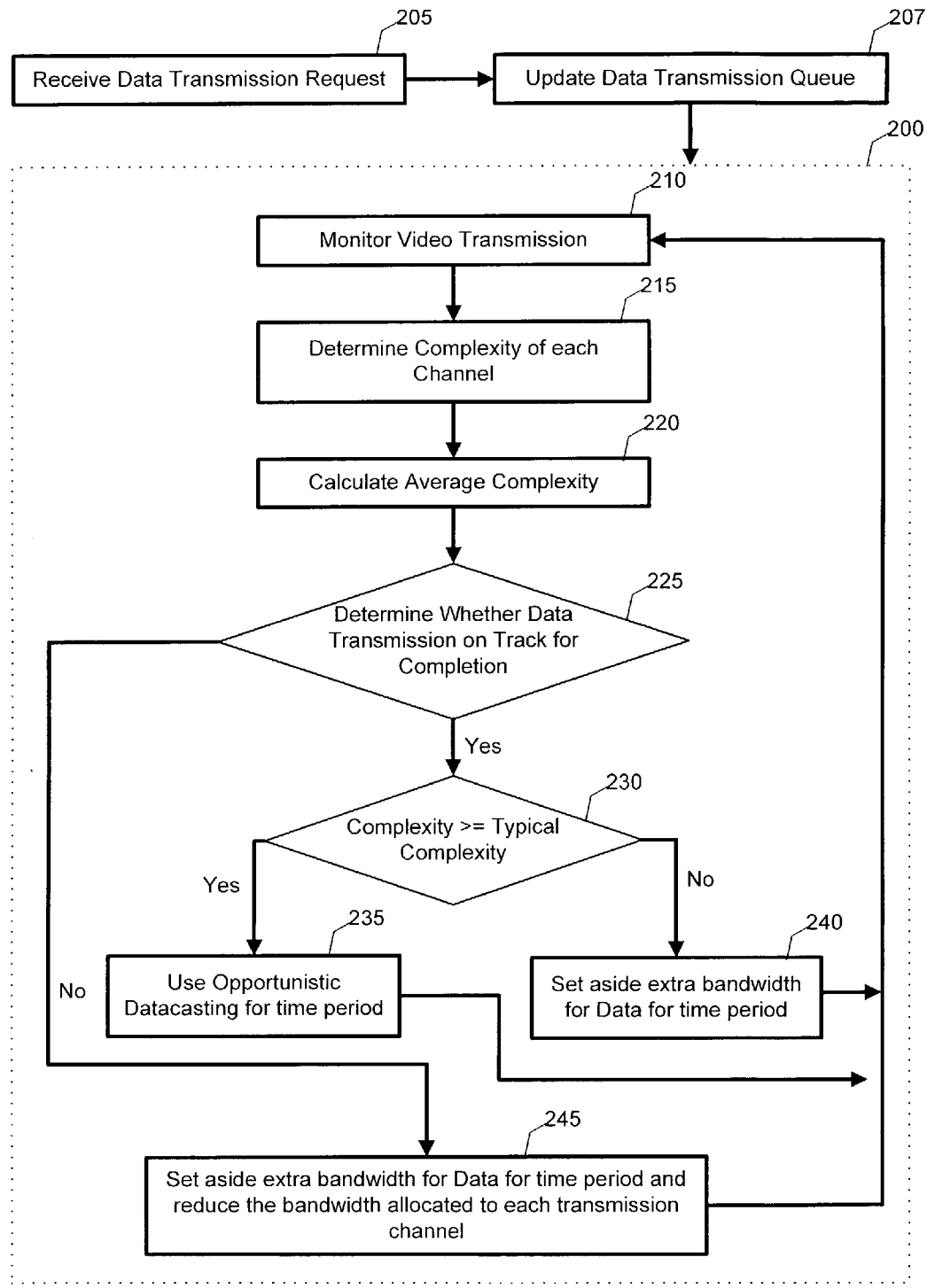
FIG. 2 is a flow diagram illustrating a method for combining data signals with video/audio signals according to an exemplary embodiment of the present invention.

FIG. 2 is a flow diagram illustrating a method for combining data signals with video/audio signals according to an exemplary embodiment of the present invention. In an exemplary embodiment of the present invention, the system 100 continuously monitors video transmissions (step 210), determines the complexity of each transmission channel (step 215), calculates an average complexity (step 220), and determines how to combine data transmission signals with video/audio transmission signals (steps 225, 230, 235, 240, 245). When the system 100 receives a data transmission request (step 205), it 100 updates the data transmission request queue in the system controller 135 (step 207). The system 100 uses the information in the data transmission queues to determine the rate at which data signals must be combined with video/audio signals to meet the quality of service requirements of the data transmission requests.

An exemplary embodiment of the main datacasting method of the present invention is shown in steps 210-245, cumulatively referred to as step 200. The main datacasting method (step 200) operates continuously to monitor video/audio channels and to ensure that data transmission requests are serviced sufficiently to meet the requested quality of service demands. Alternatively, the main datacasting method (step 200) may only be initiated when a new data transmission request is received (step 205).

In the main datacasting method (step 200), the system 100 monitors video/audio transmission channels (step 210) and determines the complexity of each video transmission channel (step 215). The system 100 then calculates an average complexity (step 220) of the video transmission channels. The average complexity is used to determine how much bandwidth is needed to provide a good quality video signal to a user. Next, the system 100 determines whether the data transmission is on track for completion (step 225). This step involves determining what percentage of the transmission is complete and what percentage of the allocated transmission time has passed. The allocated transmission time is determined by the quality of service guarantee of the data transmission request. During the first cycle through the transmission sequence for any new data transmission request, it is assumed that the transmission is on track for completion.

If the data transmission is on track for completion (step 225), the system 100 determines whether the current complexity of the video/audio transmission channels is greater than or equal to typical complexity on video/audio transmission channels (step 230). Typical complexity may be determined by calculating a long term average of complexity as measured by the system, or it may be entered into the system 100 based on statistical analysis. Alternatively, the typical complexity may be determined by any method intended to determine a typical complexity including, but not limited to, identifying a typical complexity or calculating a typical complexity. Additionally, typical complexity may be customized based on the time of day, day of the week, or any other desired criteria to ensure optimal operation of the system 100.

When the current complexity of the video/audio transmission channels are greater than or equal to the typical complexity (step 230), the system applies opportunistic datacasting (step 235). Accordingly, the system 100 inserts data into the video/audio channel transmission stream whenever a null packet would ordinarily be sent.

When the current complexity of the video/audio transmission channels are less than the typical complexity (step 230), the system assigns extra bandwidth for data during the current transmission time period (step 240). When extra bandwidth is assigned for data transmission, the system determines how much bandwidth is required for video/audio transmission to ensure a predetermined transmission quality with out degrading the video/audio transmission signal below a predetermined threshold. Video/audio transmission signals may be transmitted using less bandwidth than ordinarily reserved for them. When a signal is transmitted using less bandwidth, some signal degradation is expected. However, significant degradation of the signal may take place before it is perceivable by a user (i.e., a television viewer can not detect variation in the picture and sound quality until it degrades to a certain level). Those skilled in the art are familiar with the levels of transmission quality needed for appropriate user satisfaction. In an exemplary embodiment of the present invention, the system 100 uses statistical multiplexing to transmit video/audio signals using reduced bandwidth.

When the system 100 determines that data transmission is not on track for completion (i.e., 25% of the transmission time is past but only 10% of the data has been sent) (step 225), the system assigns extra bandwidth for data during the current transmission time period (step 245). Initially, the system 100 determines how much bandwidth is required for video/audio transmission to ensure a predetermined transmission quality with out degrading the video/audio transmission signal below a predetermined threshold. Typical video/audio transmission signals may be transmitted using less bandwidth than ordinarily reserved for them without reducing video and audio quality below thresholds perceivable to a user. If the system 100 determines that the data transmission is significantly behind track, it may determine that video/audio signals must be degraded past the point where users perceive the degradation. This may be necessary to meet certain data transmission quality of service guarantees.

While this invention has been described in detail with particular reference to preferred embodiments thereof, it will be understood that variations and modifications can be effected within the scope of the invention as defined in the appended claims.

We claim:

1. A system for providing on demand datacasting comprising:
   a system controller operable to adjust the rate at which a rate generator combines first input signals with second input signals, the controller further operable to:
   monitor the second input signals on one or more second input signal channels;
   determine the complexity of each of said one or more second input signal channels;
   calculate the average complexity of each of the one or more second input signal channels; and
   determine whether the average complexity of each of the one or more second input signal channels is greater than or equal to a typical second input signal channel complexity.

2. The system of claim 1 further comprising:
   a rate generator operable to control the rate at which one or more of the first input signals are combined with one or more of the second input signals and to output combined signals comprising the first and second input signals.

3. The system of claim 1, further comprising:
   one or more data servers operable to provide one or more first data signals; and
   a datacasting multiplexer adapted to provide the first data signals from the one or more data servers to the rate generator.

4. The system of claim 3, wherein the datacasting multiplexer further comprises:
   one or more data server buffers, each data server buffer operable to buffer the first input signals and to provide the buffered first input signals to the rate generator.

5. The system of claim 1, further comprising:
   one or more encoders, each encoder operable to encode the second input signals and to provide the encoded second input signals to the rate generator.

6. The system of claim 5, further comprising:
   one or more encoder buffers, each encoder buffer operable to buffer the second input signals and to provide the buffered second input signals to the rate generator.

7. The system of claim 1, wherein the system controller is further operable to:
   determine whether the complexity of a second input signal channel is greater than or equal to the typical second input signal channel complexity; and
   apply opportunistic datacasting if the second input signal complexity is greater than or equal to the typical second input signal complexity.

8. The system of claim 1, wherein the system controller is further operable to:
   assign extra bandwidth for the first input signals if the second input signal channel complexity is less than the typical second input signal channel complexity; and
   apply statistical multiplexing to output second input signals using reduced bandwidth.

9. The system of claim 1, wherein the system controller is further operable to:
   determine whether a transmission of a first input signal of said one or more first signals is on track for completion;
   assign extra bandwidth for the first input signal transmission if the first input signal transmission is not on track for completion; and
   reduce the bandwidth allocated to each second signal transmission channel using statistical multiplexing.

10. The system of claim 1, wherein the system controller is further operable to:
    receive a first signal transmission request; and
    update a first signal transmission queue.

11. A method for providing on demand datacasting, comprising the steps of:
    adjusting the rate at which first input signals are combined with second input signals, said adjustment step further comprising the steps of;
    monitoring second input signal transmissions on one or more second input signal channels;
    determining the complexity of each of said one or more second input signal channels;
    calculating the average complexity of the one or more second input signal channels; and
    determining whether the average complexity of the one or more second input signal channels is greater than or equal to a typical second input signal channel complexity.

12. The method of claim 11 further comprising the steps of:
    controlling the rate at which one or more of the first input signals are combined with one or more of the second input signals; and
    outputting combined signals comprising the first and second input signals.

13. The method of claim 11, further comprising the step of providing first data signals from one or more data servers to a rate generator.

14. The method of claim 13, further comprising the step of buffering the first input signals and providing the buffered first input signals to the rate generator.

15. The method of claim 11, further comprising the step of encoding second input signals and providing the encoded second input signals to a rate generator.

16. The method of claim 15, further comprising the step of buffering the second input signals and providing the buffered second input signals to the rate generator.

17. The method of claim 11, further comprising the steps of:
- determining whether the complexity of a second input signal channel is greater than or equal to the typical second input signal channel complexity; and
- applying opportunistic datacasting if the second input signal channel complexity is greater than or equal to the typical second input signal channel complexity.

18. The method of claim 11, further comprising the steps of:
- assigning extra bandwidth for the first input signals if the second input signal channel complexity is less than the typical second signal channel complexity; and
- applying statistical multiplexing to output the second input signals using reduced bandwidth.

19. The method of claim 11, further comprising the steps of:
- determining whether a transmission of a first input signal of said one or more first input signals is on track for completion;
- assigning extra bandwidth for the first input signal transmission if the first signal transmission is not on track for completion; and
- reducing the bandwidth allocated to each second input signal transmission channel using statistical multiplexing.

20. The method of claim 11, further comprising the steps of:
- receiving a first signal transmission request; and updating a first signal transmission queue.

* * * * *